US010007281B2

(12) United States Patent
Qiu et al.

(10) Patent No.: US 10,007,281 B2
(45) Date of Patent: Jun. 26, 2018

(54) THERMOREGULATOR

(71) Applicant: ZHEJIANG SANHUA AUTOMOTIVE COMPONENTS CO., LTD., Hangzhou, Zhejiang (CN)

(72) Inventors: Haoming Qiu, Hangzhou (CN); Bin Yin, Hangzhou (CN); Jianmin Zhang, Hangzhou (CN); Hui Wang, Hangzhou (CN)

(73) Assignee: Zhejiang Sanhua Automotive Components Co., Ltd., Hangzhou, Zhejiang (CN)

( * ) Notice: Subject to any disclaimer, the term of this patent is extended or adjusted under 35 U.S.C. 154(b) by 680 days.

(21) Appl. No.: 14/419,912

(22) PCT Filed: Jul. 22, 2013

(86) PCT No.: PCT/CN2013/079778
§ 371 (c)(1),
(2) Date: Feb. 5, 2015

(87) PCT Pub. No.: WO2014/023157
PCT Pub. Date: Feb. 13, 2014

(65) Prior Publication Data
US 2015/0185738 A1 Jul. 2, 2015

(30) Foreign Application Priority Data

Aug. 7, 2012 (CN) .......................... 2012 1 0280602
Aug. 7, 2012 (CN) .......................... 2012 1 0280614
(Continued)

(51) Int. Cl.
G05D 23/02 (2006.01)
F16K 11/044 (2006.01)
(Continued)

(52) U.S. Cl.
CPC ........... *G05D 23/022* (2013.01); *F01M 5/007* (2013.01); *F16K 11/044* (2013.01);
(Continued)

(58) Field of Classification Search
CPC .. G05D 23/022; G05D 23/1333; F16N 23/00; F01M 5/00; F01M 5/007; F16K 31/002; F16K 11/044; F16H 57/04; F16H 57/0413
See application file for complete search history.

(56) References Cited

U.S. PATENT DOCUMENTS 4,190,198 A 2/1980 Casuga et al.
6,138,617 A 10/2000 Kuze
(Continued)

FOREIGN PATENT DOCUMENTS

CN 1231381 A 10/1999
CN 1696553 A 11/2005
(Continued)

OTHER PUBLICATIONS

Chinese Office Action, dated Dec. 23, 2015, from corresponding Chinese Patent Application No. 201210571421.0.
(Continued)

*Primary Examiner* — David Teitelbaum
*Assistant Examiner* — Nelson Nieves
(74) *Attorney, Agent, or Firm* — Wolf, Greenfield & Sacks, P.C.

(57) ABSTRACT

A thermostatic valve includes a housing internally provided with a receiving cavity and a thermostatic actuating element mounted in the receiving cavity. The receiving cavity is in communication with the exterior through at least three ports such as a first connecting port, a second connecting port, and a third connecting port. The thermostatic actuating element is mounted in the housing via two elastic members. An
(Continued)

annular sealing collar which is fixedly mounted is provided in the receiving cavity. At least most of the thermostatic actuating element is located between the third port and the sealing collar. Such arrangement may ensure the temperature of the transmission oil when having a low temperature can rise rapidly and ensure the lubrication performance of a transmission. In addition, a processing precision requirement for components and parts can be reduced and manufacturing and mounting are more convenient.

20 Claims, 13 Drawing Sheets

(30) Foreign Application Priority Data

| Aug. 7, 2012 | (CN) | 2012 1 0280623 |
|---|---|---|
| Aug. 7, 2012 | (CN) | 2012 1 0280625 |
| Dec. 15, 2012 | (CN) | 2012 1 0571421 |

(51) Int. Cl.
  *F16K 31/00* (2006.01)
  *F01M 5/00* (2006.01)
  *G05D 23/13* (2006.01)
  F16H 57/04 (2010.01)

(52) U.S. Cl.
  CPC ....... *F16K 31/002* (2013.01); *G05D 23/1333* (2013.01); *F16H 57/04* (2013.01); *F16H 57/0413* (2013.01)

(56) References Cited

U.S. PATENT DOCUMENTS

| 6,237,634 | B1* | 5/2001 | Narita | F15B 13/0405 |
| | | | | 137/625.27 |
| 6,253,837 | B1 | 7/2001 | Seiler et al. | |
| 8,066,198 | B2* | 11/2011 | Palanchon | G05D 23/1333 |
| | | | | 236/100 |
| 2001/0009099 | A1* | 7/2001 | Kobayashi | F16K 31/002 |
| | | | | 62/204 |
| 2002/0005179 | A1 | 1/2002 | Frunzetti et al. | |
| 2002/0023966 | A1* | 2/2002 | Minowa | F16K 31/002 |
| | | | | 236/92 B |
| 2002/0043224 | A1* | 4/2002 | Richter | F01P 7/167 |
| | | | | 123/41.1 |
| 2002/0084068 | A1* | 7/2002 | Hugger | F16K 11/044 |
| | | | | 165/284 |
| 2004/0016260 | A1* | 1/2004 | Kobayashi | F16K 31/002 |
| | | | | 62/527 |
| 2005/0145706 | A1 | 7/2005 | Cardinali Ieda | |
| 2005/0252238 | A1* | 11/2005 | Kobayashi | F16K 31/002 |
| | | | | 62/527 |
| 2006/0070655 | A1* | 4/2006 | Tebby | F04D 27/0215 |
| | | | | 137/112 |
| 2006/0108435 | A1 | 5/2006 | Kozdras et al. | |
| 2007/0164123 | A1* | 7/2007 | Willers | G05D 23/1333 |
| | | | | 236/93 R |
| 2009/0026405 | A1* | 1/2009 | Sheppard | F16K 15/06 |
| | | | | 251/364 |
| 2010/0126594 | A1* | 5/2010 | Sheppard | F01P 7/16 |
| | | | | 137/340 |
| 2010/0186831 | A1* | 7/2010 | Roman | G05D 23/1333 |
| | | | | 137/468 |
| 2011/0005741 | A1 | 1/2011 | Sheppard | |
| 2012/0055565 | A1 | 3/2012 | Kanzaka et al. | |
| 2012/0132413 | A1 | 5/2012 | Cheadle et al. | |
| 2012/0247582 | A1 | 10/2012 | Lamb et al. | |

FOREIGN PATENT DOCUMENTS

| CN | 101509560 A | 8/2009 |
| CN | 101738027 A | 6/2010 |
| CN | 102224367 A | 10/2011 |
| CN | 102312997 A | 1/2012 |
| CN | 102312998 A | 1/2012 |
| CN | 102359576 A | 2/2012 |
| CN | 102359577 A | 2/2012 |
| CN | 102449570 A | 5/2012 |
| CN | 102472407 A | 5/2012 |
| CN | 102312998 A | 1/2015 |
| EP | 0947676 A2 | 10/1999 |
| GB | 770945 A | 3/1957 |
| JP | 2003166670 A | 6/2003 |
| WO | WO 99/15767 A1 | 4/1999 |
| WO | PCT/CN2013/079773 | 7/2013 |

OTHER PUBLICATIONS

Chinese Office Action, dated Jul. 3, 2015, from corresponding Chinese Patent Application No. 201210280625.9.
Chinese Office Action, dated Sep. 6, 2015, from corresponding Chinese Patent Application No. 201210280623.X.
Chinese Office Action, dated Sep. 25, 2015, from corresponding Chinese Patent Application No. 201210280614.0.
Chinese Office Action, dated Sep. 21, 2015, from corresponding Chinese Patent Application No. 201210280602.8.
Chinese Office Action, dated May 25, 2017, in connection with Chinese Application No. 201380042385.1.
International Search Report dated Oct. 31, 2013 from corresponding International Application PCT/CN2013/079778.
International Search Report dated Oct. 24, 2013 from potentially related International Application No. PCT/CN2013/079773.

* cited by examiner

THERMOREGULATOR

This application is the national phase of International Application No. PCT/CN2013/079778, titled "THERMOREGULATOR", filed on Jul. 22, 2013, which claims the benefit of priorities to Chinese patent application No. 201210571421.0 titled "THERMOSTATIC VALVE" and filed with the Chinese State Intellectual Property Office on Dec. 15, 2012;

Chinese patent application No. 201210280614.0 titled "THERMOSTATIC VALVE FOR HEAT EXCHANGING CIRCUIT" and filed with the Chinese State Intellectual Property Office on Aug. 7, 2012;

Chinese patent application No. 201210280623.X titled "CAP ASSEMBLY FOR THERMOSTATIC VALVE" and filed with the Chinese State Intellectual Property Office on Aug. 7, 2012;

Chinese patent application No. 201210280625.9 titled "THERMOSTATIC VALVE FOR HEAT EXCHANGING CIRCUIT" and filed with the Chinese State Intellectual Property Office on Aug. 7, 2012; and Chinese patent application No. 201210280602.8 titled "THERMOSTATIC VALVE ASSEMBLY FOR HEAT EXCHANGING CIRCUIT" and filed with the Chinese State Intellectual Property Office on Aug. 7, 2012. The entire disclosures of all applications are incorporated herein by reference.

TECHNICAL FIELD

The present application relates to the field of heat exchanging technology, and in particular to a thermostatic valve.

BACKGROUND

During the running process of an automobile, lubricating oil is required to be supplied to various components timely to guarantee the normal operation of the automobile. If the lubricating performance of the lubricating oil is not good enough, the service life of the automobile will be affected, and even a traffic accident may be caused. The lubricating performance of the lubricating oil is significantly associated with its temperature, and the lubricating performance of the lubricating oil will be affected when the temperature of the lubricating oil is too high or too low.

During the normal operation of the automobile, the temperature of the lubricating oil generally won't be too high, and when the automobile runs under overload, runs on a snowfield or runs off-road in a four-wheel driving mode, or runs when a hydraulic torque converter slips excessively, the temperature of the transmission oil is exceeded, thus losing the lubricating performance.

Conventionally, the temperature of the transmission oil is mainly regulated by a cooling flow path composed of a thermostatic valve and an oil cooler. When the temperature of the transmission oil rises, a thermosensitive substance in a thermostatic actuating element is heated to expand, a passage which allows the transmission oil directly flows back into the transmission is closed, and the high-temperature oil flows into the oil cooler to be cooled and then flows back to the transmission. When the temperature of the oil is too low, the thermosensitive substance in the thermostatic actuating element is solidified and contracted, a piston is reset, and the passage which allows the transmission oil directly flows back into the transmission is opened. During the flowing process, the oil in the transmission oil path exchanges heat with heat-generating components in the transmission, thus the temperature of the oil gradually rises, and the thermosensitive substance of the thermostatic valve gradually expands to control the flow of the oil.

If the thermostatic valve is not provided, the passage for the transmission oil flowing into the oil cooler is always opened, which may increase oil consumption under low temperature and affect the service life of the transmission. Hence, in practical application, when the temperature of oil is lowered to a certain extent, it is not desirable that the transmission oil enters into the oil cooler, or only a few of transmission oil is allowed to enter into the oil cooler. The situation that oil enters into the oil cooler when a flow path of cooling liquid is blocked is referred to as an internal leakage. In the conventional technology, the pressure inside the oil cooler is used to prevent the transmission oil from entering into the oil cooler. Due to differences between various systems, the requirements on the internal leakage of the thermostatic valve are different, and the internal leakage degree of the existing thermostatic valve cannot meet the requirements in the practical application in some cases.

SUMMARY

An object of the present application is to provide a thermostatic valve having a new structure, which has a relatively simple structure design, is easier to produce and assemble. The following technical solutions are provided according to the present application.

A thermostatic valve includes a housing in which an receiving cavity is provided, and a thermostatic actuating element mounted in the receiving cavity, the receiving cavity is in communication with an outside through at least three connecting ports including a first connecting port, a second connecting port and a third connecting port; the thermostatic actuating element includes a main body of the thermostatic actuating element in which a thermosensitive substance is provided, and the thermostatic actuating element is mounted in the receiving cavity of the housing via two elastic members; and an annular sealing collar which is fixedly mounted is provided in the receiving cavity, and the first connecting port and the second connecting port are located at two sides of the sealing collar, respectively; and a first passage is formed in a case that the second connecting port, an inner hole of the sealing collar and the first connecting port are in communication with each other, and a second passage is formed in a case that the first connecting port and the third connecting port are in communication with each other;

in a case that a fluid has a low temperature, the thermosensitive substance in the thermostatic actuating element contracts, the main body of the thermostatic actuating element is moved towards the sealing collar under the action of an elastic force of the respective elastic member, which enables a second engaging portion of the main body of the thermostatic actuating element or a second engaging portion fixedly provided on the main body of the thermostatic actuating element to abut against the sealing collar or cap the inner hole of the sealing collar, to block the first passage and open the second passage; and in a case that the fluid has a high temperature, the thermosensitive substance in the thermostatic actuating element expands, the main body of the thermostatic actuating elements moves towards the third connecting port, until a first engaging portion of the main body of the thermostatic actuating element or a first engaging portion fixedly provided on the main body of the thermostatic actuating element abuts against an end surface of a part of the housing where the third connecting port is located or covers the third connecting port, to block the second passage and open the first passage.

A first valve opening is provided in the housing at a position where the third connecting port is provided, and the first valve opening is a port communicating the third connecting port with a cavity where the main body of the thermostatic actuating element is provided; in a case that the first valve opening is closed, the second passage is blocked and the first passage is opened; a second valve opening is provided on the sealing collar to communicate the first connecting port with the second connecting port, and the second valve opening is a port of the sealing collar that faces the third connecting port or a port of the inner hole of the sealing collar; and in a case that the second valve opening is closed, the second passage is opened and the first passage is blocked.

The housing has an open end which is in communication with the receiving cavity, the open end of the housing is sealed by an cap which is fixedly and hermetically mounted; the thermostatic actuating element further includes a piston which is slidably mounted at a first end of the main body of the thermostatic actuating element, and one end of the piston is located outside the main body of the thermostatic actuating element and passes through an annular hole of the sealing collar; and the two elastic members includes a first elastic member and a second elastic member; the first elastic member is arranged at the cap or at a side adjacent to the cap, and the first elastic member has one end abutting against the cap, and another end abutting against or indirectly abutting against the piston at least during a moving process; the second elastic member is arranged at the third connecting port or a side adjacent to the third connecting port, and the second elastic member has one end abutting against an inner wall or a bottom wall of the receiving cavity of the housing, and another end abutting against the main body; an initial deformation force of the first elastic member is greater than or equal to a pressure applied to the second elastic member when the first engaging portion abuts against a part where the first valve opening is located; the thermosensitive substance expands when the thermostatic actuating element is heated, and after the piston abuts against or indirectly abuts against the first elastic member, the main body is moved with respect to the piston, i.e. moving towards the third connecting port, until the first engaging portion abuts against the part where the first valve opening is located, and then the piston compresses the first elastic member and moves towards the cap.

A third passage in communication with the third connecting port is provided in the housing, axes of the third connecting port and the third passage are substantially parallel to each other, a shoulder portion is formed at a junction of the third connecting port and the third passage, and the second elastic member abuts against one end of the housing, i.e., abutting against the shoulder portion formed at the junction of the third connecting port and the third passage; in a case that the fluid has a high temperature, the thermosensitive substance in the thermostatic actuating element expands, the main body of the thermostatic actuating element moves towards the third connecting port against the elastic force of the second elastic member, until the first engaging portion is in pressingly contact with the part where the first valve opening is located to block the third connecting port; and a radius of the third connecting port is larger than a radius of the third passage, a distance from a bottom of the third passage to a bottom of the third connecting port is L, and a diameter of the passage is R, wherein $1 > L/R \geq 1/16$.

A retaining member is provided at a circumferential side of the main body of the thermostatic actuating element, an outer diameter of the retaining member is greater than an inner diameter of the third connecting port; one end, which is between the retaining member and the third connecting port, of the main body has an outer diameter smaller than the inner diameter of the third connecting port, the second elastic member has one end in pressingly contact with the retaining member, and the other end in pressingly contact with the inner wall or the bottom wall of the housing, and the retaining member is fixedly mounted or integrally formed with the main body of the thermostatic actuating element; in a case that the thermostatic actuating element is heated, the main body moves downwards to drive the retaining member to move, until the first engaging portion, facing the third connecting port, of the retaining member abuts against the part where the first valve opening is located, to block the third connecting port; and then a force generated by the expansion of the thermosensitive substance of the thermostatic actuating element when being heated is enough to continue compressing the first elastic member.

A mounting portion is provided at the second end of the main body of the thermostatic actuating element, a diameter of an outer side wall of the main body of the thermostatic actuating element is greater than an inner diameter of the third connecting port, and one end of the second elastic member is fixed by the mounting portion; a third passage is provided in the housing to communicate the third connecting port with a corresponding external port; a flat surface portion is provided between the outer side wall of the main body and the mounting portion and functions as the first engaging portion for cooperating with the first valve opening, the mounting portion is configured to radially limit the second elastic member, a flat contacting part of the first engaging portion on the main body is configured to axially limit the second elastic member; an outer diameter of each of the second elastic portion and the mounting portion is smaller than the inner diameter of the third connecting port, the other end of the second elastic member extends into the third connecting port of the housing and is in pressingly contact with the inner wall or the bottom wall of the housing; and when the first engaging portion of the main body abuts against the valve opening, the main body blocks the third connecting port to separate the external port in communication with the third connecting port from the first connecting port.

A passage is provided in the housing to communicate the third connecting port with a corresponding external port; the main body of the thermostatic actuating element is of a stepped cylindrical shape, and a first end of the main body has an outer diameter greater than an outer diameter of a second end of the main body, to form a stepped shoulder; one end of the second elastic member is pressingly connected to the stepped shoulder portion on the circumferential side of the main body of the thermostatic actuating element, the other end of the second elastic member is in pressingly contact with an inner wall of the housing at a position where the valve opening is located; a second elastic member having an inner diameter smaller than the outer diameter of the first end of the main body of the thermostatic actuating element is sleeved on the second end of the main body of the thermostatic actuating element, and a diameter of the outer side wall of the second end of the main body of the thermostatic actuating element is greater than the inner diameter of the third connecting port; a circumferential side of an end portion of the second end of the main body is chamfered or the end portion of the second end of the main body is frustum-shaped; the end portion, facing the third connecting port, of the second end of the main body functions as the first engaging portion for cooperating with the first valve opening; in a case that the thermostatic actuating element is heated, when the engaging portion of the main body abuts against the part where the valve opening is located, the main body blocks the third connecting port to separate the external port in communication with the third connecting port through the passage from the first connecting port.

The cap is provided with an open end functioning as a receiving portion, and the open end faces the receiving cavity of the housing; and the thermostatic valve further includes a spring seat, and a retaining member which is axially positioned. The retaining member is fixed to the cap or integrally formed with the cap; and a first elastic member of the two elastic members is arranged in the receiving portion of the cap, has one end abutting against a bottom wall of the receiving portion of the cap, and another end abutting against the spring seat; and the first elastic member, the spring seat and the retaining member are arranged in the receiving portion of the cap in sequence, and the spring seat is fixed in the receiving portion of the cap via the retaining member.

The cap is provided with an open end functioning as an receiving portion, and the open end faces the receiving cavity of the housing; and the thermostatic valve further includes a spring seat, and a retaining member which is axially positioned, wherein the retaining member is fixed to the cap or integrally formed with the cap; and a first elastic member of the two elastic members is arranged in the receiving portion of the cap, has one end abutting against a bottom wall of the receiving portion of the cap, and another end abutting against the spring seat; the first elastic member, the spring seat and the retaining member are arranged in the receiving portion of the cap in sequence, and the spring seat is fixed in the receiving portion of the cap via the retaining member; a surface of the spring seat away from the receiving portion is in pressingly contact with the retaining member or the piston; and when the piston is moving, the piston is in contact with the first elastic member via the spring seat.

The cap is provided with a recess at the receiving portion, and the retaining member is retained in the recess to be axially positioned; the cap is fixed to the housing by a snap ring, the snap ring is provided at the open end of the housing, the cap is fixed at the open end of the housing by the snap ring, and a sealing member is provided between an outer side wall of the cap and the inner wall of the housing.

The cap is integrally formed with the sealing collar, the cap is fixedly connected to the sealing collar via a connecting portion, a fluid communicating hole is provided between the cap and the sealing collar, and the second connecting port, the fluid communicating hole, the inner hole of the sealing collar and the first connecting port are in communication with each other to form the first passage; and an outer diameter portion of the sealing collar is 0.05 to 0.30 mm smaller than an inner wall of a portion, corresponding to the sealing collar, on the receiving cavity of the housing.

The outer wall of the housing is provided with a connecting member for communicating the receiving cavity with an external device, and the connecting member is integrally formed with the housing; and the piston is integrally formed with the spring seat, or one end of the piston of the thermostatic actuating element is fixedly mounted on the spring seat.

The thermostatic valve is connected to the external device via a connector, an external conduit is provided on an outer side of the housing, and a through hole having a dimension matching with a dimension of the external conduit is provided on the connector at a position corresponding to the external conduit; and a contour shape of a mounting surface of the connector configured to connect the external device matches with a contour shape of a mounting surface of the external device.

A bypass passage is provided on the sealing collar, and in a case that the first passage is blocked, the bypass passage allows the fluid to flow at a small flow quantity.

The bypass passage is a notch adjacent to the inner hole of the sealing collar or a through hole provided on the sealing collar, and a size of the hole ranges from 0.3 to 1.5 mm.

The sealing collar is provided on the first passage of the thermostatic valve of the present application, the thermostatic actuating element opens or closes the sealing collar by contract or expansion of the thermosensitive substance, thus when the oil temperature is low, the transmission oil directly flows back into the transmission via the second passage and will not enter into the external cooling device via the first passage, which ensures that the temperature of the transmission oil when having a low temperature can rise rapidly, and ensures the lubricating performance of the transmission. Also, the requirements on machining precision of components can be reduced, and the manufacture and assembly can be more convenient.

DETAILED DESCRIPTION

Figure 1:
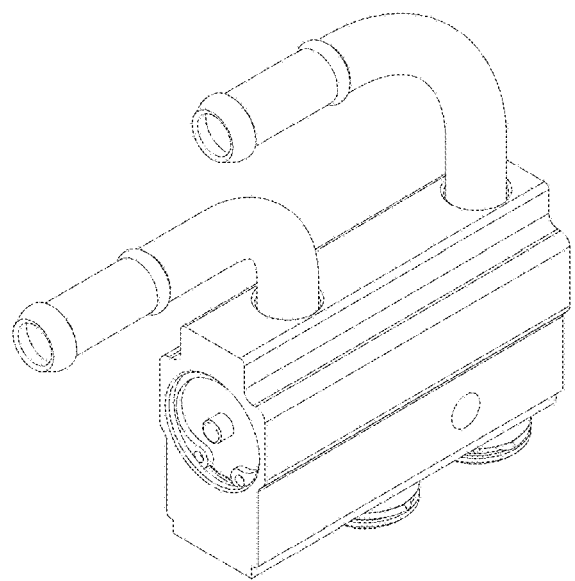
FIG. 1 is a perspective schematic view of a thermostatic valve according to an embodiment of the present application.
Figure 2:
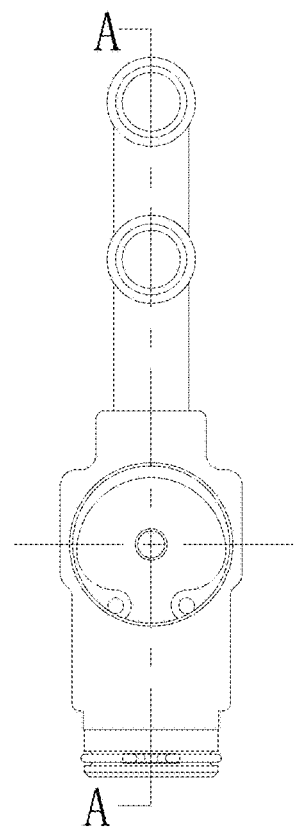
FIG. 2 is a front view of the thermostatic valve shown in FIG. 1.
Figure 3:
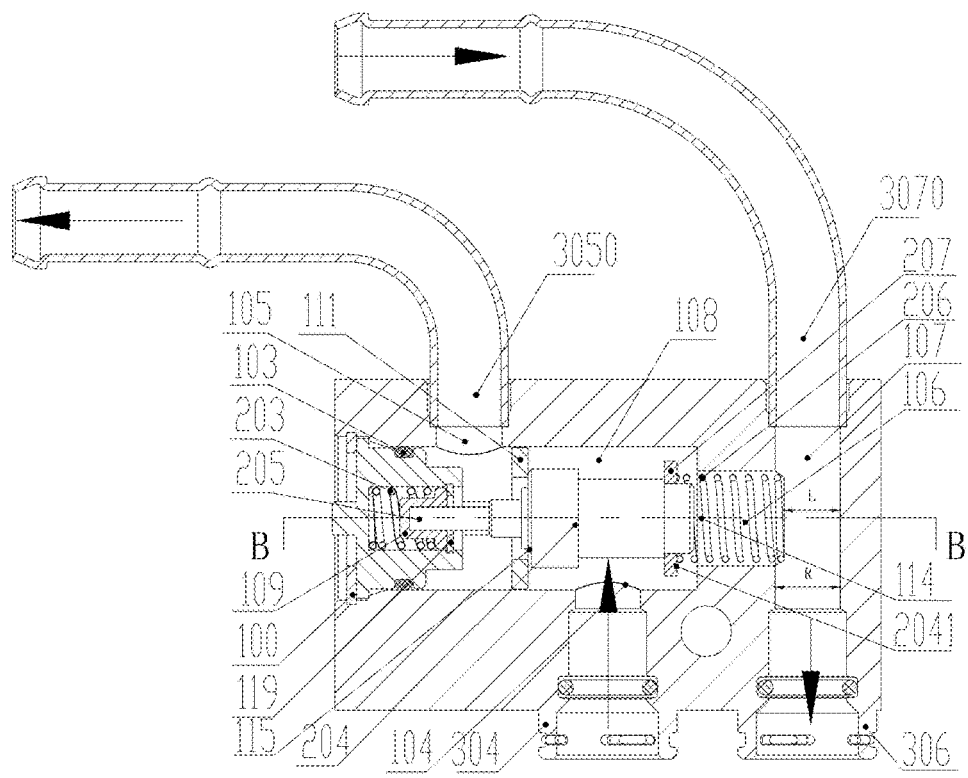
FIG. 3 is a sectional schematic view of the thermostatic valve according to a first embodiment of the present application taken along line A-A in FIG. 2, which is in a state that an oil passage is blocked.
Figure 4:
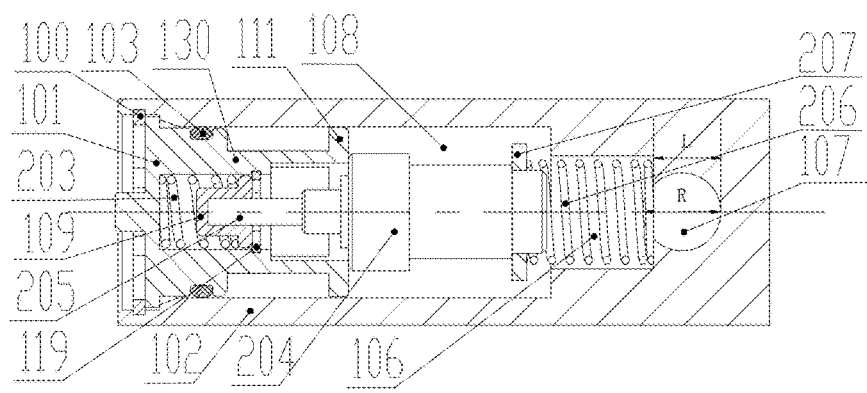
FIG. 4 is a sectional view of the thermostatic valve shown in FIG. 3 taken along line B-B.
Figure 5:
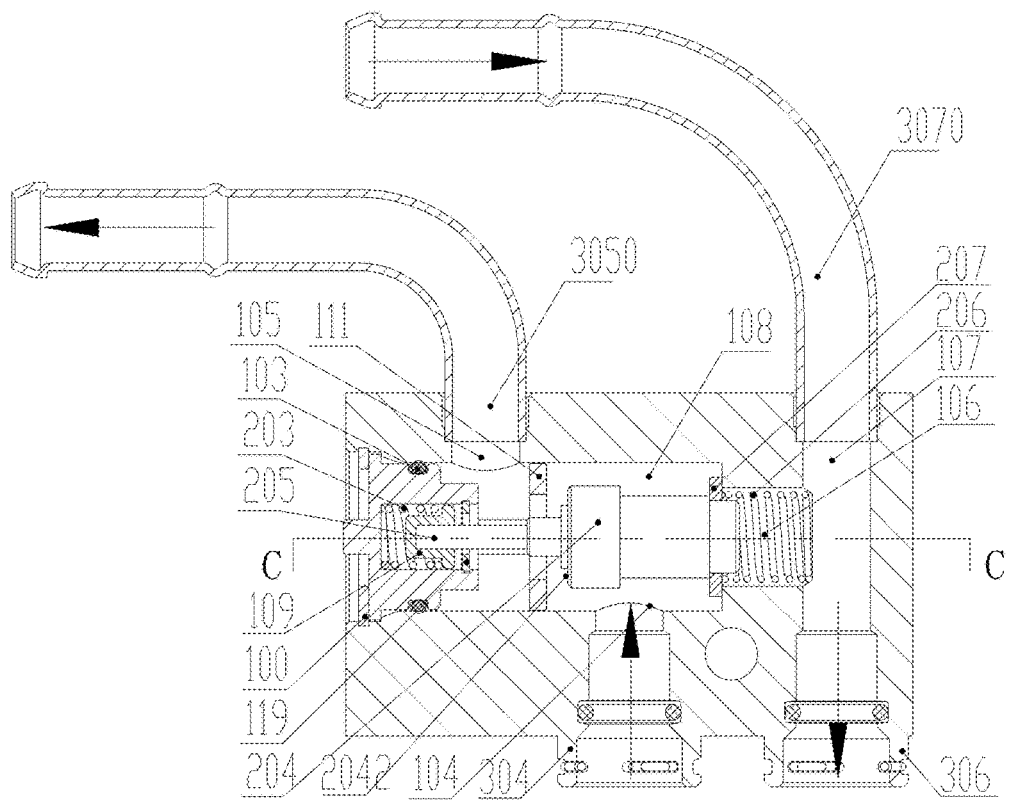
FIG. 5 is a sectional schematic view of the thermostatic valve shown in FIG. 2 taken along line A-A, which is in a state that the oil passage is released.
Figure 6:
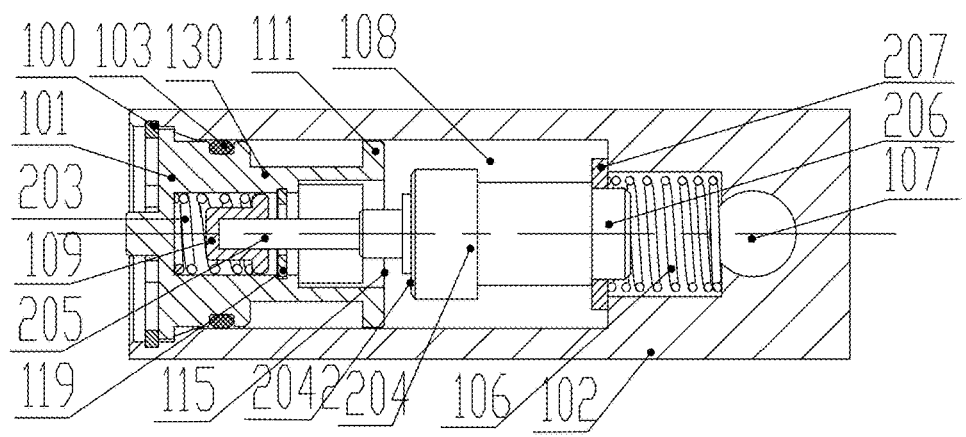
FIG. 6 is a sectional view of the thermostatic valve shown in FIG. 5 taken along line C-C.

For a thermostatic valve according to the present application, in using, a thermosensitive substance of a thermostatic actuating element expands or contracts according to the temperature of transmission oil in the thermostatic valve, so as to control the amount of transmission oil entering into an external fluid cooling device, such as an oil cooler, and to further control the operating temperature of the transmission oil in a transmission within an effective range, avoid the temperature of the transmission oil from being too high or too low, thereby ensuring the transmission oil to have a better performance, and ensuring the normal operation of the transmission. Hereinafter, embodiments of the thermostatic valve according to the present application are described in detail in conjunction with drawings.

In the specification, terms indicating direction or position, such as "top", "bottom", "left", "right", "upper", "lower" and so on, are all illustrated on a basis of the relationship of up, down, left and right of the drawings. An initial deformation force of a first elastic member 203 referred to in the specification indicates a pressure applied to the first elastic member 203 or an elastic force of the first elastic member 203 in a state that a retaining member 119 is just no longer subjected to the pressure from the first elastic member 203 when the first elastic member 203 generates compression deformation when subjected to a pressure from a piston 205.

As shown in FIGS. 1 to 8, 19, 20 and 22 to 24, a thermostatic valve includes a housing 102 having a receiving cavity, and a thermostatic actuating element fitted in the receiving cavity 108. The thermostatic actuating element includes a main body 204 in which a thermosensitive substance is provided, and a piston 205 slidably mounted on one end of the main body, and one end of the piston 205 protrudes out of the main body 204. The housing 102 is provided with an open end which can be closed by a cap 101. The thermostatic actuating element is mounted in the receiving cavity 108 of the housing 102 through two elastic members (i.e. a first elastic member and a second elastic member). An annular sealing collar 111 is fixedly mounted in the receiving cavity 108. The housing 102 further includes three connecting ports, i.e. a first connecting port 104, a second connecting port 105 and a third connecting port 106. A first valve opening 114 is provided between the third connecting port 106 and the first connecting port 104, and the first connecting port 104 and the second connecting port 105 are located at two sides of the sealing collar 111, respectively. As shown in the drawings, the first valve opening 114 is formed in the housing 102 at a position where the third connecting port 106 is arranged, and the first valve opening 114 forms a connection opening communicating the third connecting port with the cavity where the main body of the thermostatic actuating element is arranged. When the thermostatic actuating element is heated, the thermosensitive substance expands, thus after the piston 205 abuts against or indirectly abuts against the first elastic member, the main body moves with respect to the piston, that is moving towards the third connecting port, and after a first engaging portion of the main body abuts against a portion where the first valve opening 114 is located, that is a bottom wall surface of a plane of the housing where the first valve opening 114 is located, the piston compresses the first elastic member and moves towards the cap. The first elastic member is arranged on the cap or at one side adjacent to the cap, one end of the first elastic member abuts against the cap, and another end thereof abuts against or indirectly abuts against the piston at least during the moving process. The second elastic member is arranged at the third connecting port or at one side adjacent to the third connecting port, one end of the second elastic member abuts against an inner wall or a bottom wall of the receiving cavity of the housing, and the other end thereof abuts against the main body. An initial deformation force of the first elastic member 203 is greater than or equal to a pressure applied to the second elastic member 206 when the main body blocks the first valve opening.

One side of an outside of the housing 102 is provided with external ports for communicating with an external device such as an oil cooler, the external ports include a first external port 3050 and a second external port 3070, and the other side of the housing 102 is provided with a first connecting member 304 and a second connecting member 306 which are configured to connect an external device such as a transmission oil path. In the embodiments shown in the Figures, the connecting members are integrally formed with the housing, which reduces the outline dimension of the thermostatic valve, saves the assembling space, and reduces the risk of fluid leakages in a structure that the connecting member and the housing are fixedly connected, thus the shock resistance is also improved. Additionally, the connecting members and the housing can also have a combined structure. A first passage is formed when the second connecting port 105, an inner hole of the sealing collar 111 and the first connecting port 104 are in communication with each other, and a second passage is formed when the first connecting port 104, the first valve opening 114 and the third connecting port 106 are in communication with each other. A second valve opening 115 is formed on the sealing collar 111 to communicate the first connecting port with the second connecting port. The second valve opening is an opening of the sealing collar 111 that faces the third connecting port, and the second valve opening can also be a port of the inner hole of the sealing collar. When the second valve opening 115 is blocked, the second passage is released and the first passage is blocked.

When the temperature of fluid is low, the thermosensitive substance in the thermostatic actuating element contracts, the elastic force of the second elastic member urges the main body 204 of the thermostatic actuating element to move towards the sealing collar 111, and urges a second engaging portion 2042 of the main body 204 to abut against the sealing collar 111 to close the second valve opening 115 of the sealing collar 111, and in this case, the first passage is blocked and the second passage is opened, and the fluid flowing into the housing through the first connecting port can directly flow out of the third connecting port 106 through the first valve opening 114. The expression of "the temperature of fluid is low" refers to that the temperature reaches or is below a predetermined low temperature. When the temperature of fluid is high, the thermosensitive substance in the thermostatic actuating element expands, after the piston abuts against the first elastic member 203 via a spring seat 109, the main body 204 moves with respect to the piston 205, that is moving towards the third connecting port 106, until the first engaging portion 2041 provided on the main body 204 abuts against the portion where the first valve opening 114 is located to close the third connecting port 106, and in this case, the second passage is blocked, and the first passage is opened. The expression of "the temperature of fluid is high" refers to that the temperature reaches or exceeds a predetermined high temperature. Thus, the thermostatic valve can control the flow quantity of fluid passing through the two passages by moving the thermostatic actuating element, and the problem of internal leakage of the thermostatic valve can be effectively controlled.

In the embodiment shown in the drawings, a snap ring 100 is fixedly mounted at the open end of the housing 102. The cap 101 is fixed at the open end of the housing 102 under the action of the snap ring 100, and the radial position of the cap 101 is fixed by the cooperation with the open end of the housing 102; and the cap 101 is in pressingly contact with the snap ring 100, thereby fixing the axial position of the cap 101. In order to ensure sealing, a first sealing ring 103 is provided between the cap 101 and an inner wall of the housing 102. When the second passage is blocked, the end of the piston 205 that protrudes out of the main body 204 passes through an annular hole of the sealing collar 111 and is pressingly connected to the cap 101 through the spring seat 109 and the first elastic member 203. When the second passage is opened, the protruding end of the piston 205 passes through the annular hole of the sealing collar 111 and is in loose contact with the spring seat 109, i.e. there is no interactive force therebetween. In this case, the other end of the first elastic member 203 is fixed by abutting against a retaining member 119 through the spring seat 109. Additionally, the other end of the main body 204 of the thermostatic actuating element is provided with the second elastic member 206 in a compressed state. The initial deformation force of the first elastic member 203 is greater than or equal to the pressure applied to the second elastic member 206 or the elastic force of the second elastic member 206 when the first engaging portion of the main body abuts against the portion where the first valve opening 114 is arranged. The thermostatic valve according to the first embodiment of the present application is illustrated below in conjunction with FIGS. 3 to 6, and the structure of a cap of the thermostatic valve can refer to FIGS. 9 to 13. The cap 101 includes a retaining portion 121, a body portion 130 having an outer diameter smaller than that of the retaining portion, a sealing collar 111, and a connecting portion 141 connecting the sealing collar 111 with the body portion 130. In this embodiment, the connecting portion forms two blocky connecting portions symmetrically arranged, and the main portion 130 is provided with a first recess 131 for receiving a first sealing ring 103. The cap 101 is provided with a space 171 therein and has an open end facing the receiving cavity 108, and the space 171 is provided with a retaining slot 181. The retaining portion 121 of the cap 101 cooperates with a stepped portion provided in the open end of the housing, the cap 101 is sealed with the housing via the first sealing ring 103 provided in the first recess 131, and is fixed in a recess of the housing via the snap ring 100. A first elastic member 203, a spring seat 109, and a retaining member 119 fixedly mounted at an inner side of the open end of the cap 101 are provided in the space 171 of the cap 101. The first elastic member 203 has one end abutting against a bottom wall of the cap 101, and another end in pressingly contact with the spring seat 109, and the spring seat 109 is axially fixed by the retaining member 119 retained in the retaining slot 181. When the first passage is opened, the piston 205 is in pressingly contact with the spring seat 109. When the second passage is opened, the spring seat 109 is in pressingly contact with the retaining member 119, and the piston is in a loose contact with the spring seat 109. The spring seat 109 has a straw hat shape, and an end portion of the protruding end of the piston is located in a recess of the spring seat 109. Furthermore, a communicating hole 151 is provided between the cap 101 and the sealing collar 111. The second connecting port 105, the communicating hole 151, the inner hole of the sealing collar 111, i.e. the second valve opening 115, and the first connecting port 104 are in communication with each other to form the first passage. The outer diameter portion of the sealing collar 111 fits with the inner wall of a corresponding part on the receiving cavity of the housing, and the outer diameter portion of the sealing collar 111 is 0.05 to 0.30 mm smaller than the inner wall of the corresponding part on the receiving cavity of the housing.

As shown in the Figures, the piston 205 and the spring seat 109 are formed separately, and in practical application, the piston 205 and the spring seat 109 can also be formed integrally. In this embodiment, the cap has an integral structure, the sealing collar 111 and the body portion are integrally formed, and the cap may be manufactured by machining a metal piece. Besides, the cap may also be a molded piece which is formed of plastic materials, such as, PBT, PET, PPS, and can be produced by injection molding process. The end coved formed by using the plastic material and the injection molding process has a low material consumption and a low weight, and the shape of the cap is easier to form by the injection molding process than the machining process.

Furthermore, the cap can also have a structure shown in FIGS. 14 to 18. The cap of this embodiment is substantially the same as the technical solution of the first embodiment, and the difference is that, in this embodiment, an outer circumferential side of the sealing collar 111 is provided with a second recess 161 for receiving a second sealing ring 191. Thus, the sealing performance between the sealing collar 111 and the inner wall of the housing can be ensured.

The thermostatic valve further includes a retaining member 207. The retaining member 207 is fixedly provided at one end of the main body 204 of the thermostatic actuating element; alternatively, the retaining member 207 is integrally formed with the main body 204 of the thermostatic actuating element. The first engaging portion 2041 is a flat surface of the retaining member that faces the third connecting port, and the first valve opening 114 is formed by a stepped portion of the housing which is formed at the position where the third connecting port is located. When the temperature of the fluid is high, the thermosensitive substance in the thermostatic actuating element expands, and after the piston abuts against the spring seat 109, the main body 204 of the thermostatic actuating element moves towards the third connecting port 106 until the first engaging portion 2041 of the retaining member 207 abuts against the part where the first valve opening 114 is located, thus the third connecting port 106 is blocked, and the fluid flows through the first passage, passes through a fluid cooling device, such as an oil cooler, to be cooled, and then flows from the second external port 3070 back to a passage in communication with the third connecting port 106, and finally flows back to the transmission via the second connecting member 306. The second elastic member 206 is provided at the third connecting port 106 or at a side adjacent to the third connecting port. The second elastic member has one end abutting against an inner wall or a bottom wall of the receiving cavity of the housing, or abutting against an inner wall or a bottom wall of the third connecting port; and has another end abutting against the main body. In this embodiment, one end of the second elastic member 206 abuts against a shoulder portion formed at a junction between the third connecting port 106 and the third passage 107, and the other end of the second elastic member 206 abuts against the retaining member of the main body. Furthermore, the retaining member 207 is pressingly connected to the shoulder portion via the second elastic member 206. In this embodiment, a radius of the third connecting port 106 is greater than a radius of the third passage 107, a distance from the bottom of the third passage 107 to the bottom of the third connecting port 106 is L, a diameter of the passage 107 is R, wherein $L/R \geq 1/16$, preferably, $1 > L/R \geq 1/16$.

Figure 7:
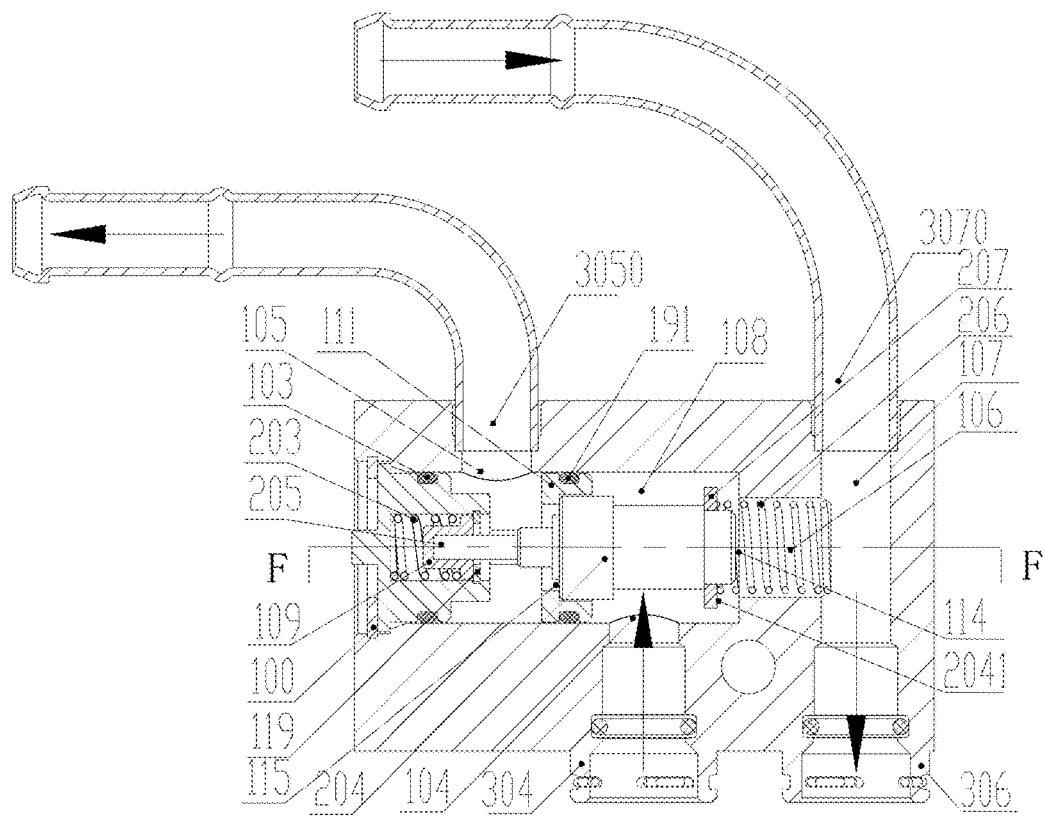
FIG. 7 is a sectional schematic view of a thermostatic valve according to a second embodiment of the present application taken along line A-A in FIG. 2, which is in a state that the oil passage is blocked.
Figure 8:
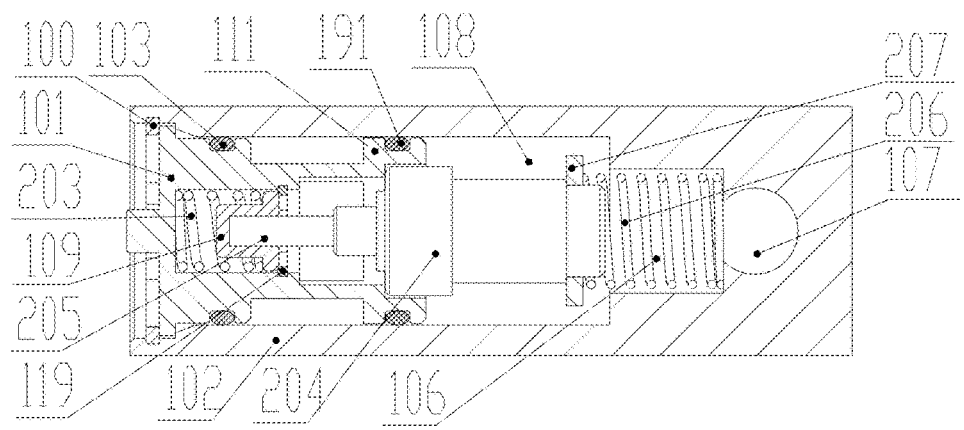
FIG. 8 is a sectional view of the thermostatic valve shown in FIG. 7 taken along line F-F.
Figure 9:
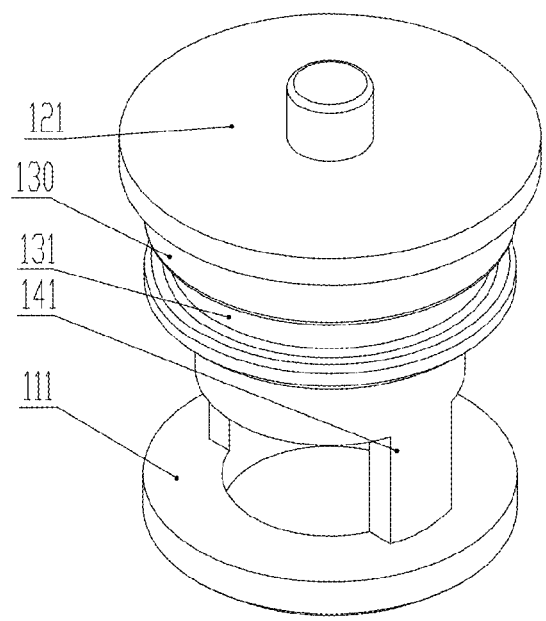
FIG. 9 is a perspective schematic view of an cap of the thermostatic valve according to the first embodiment of the present application.
Figure 10:
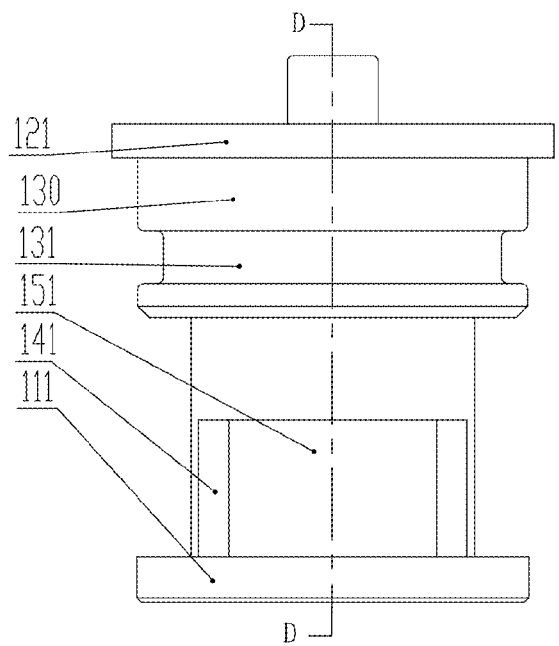
FIG. 10 is a front view of the cap shown in FIG. 9.
Figure 11:
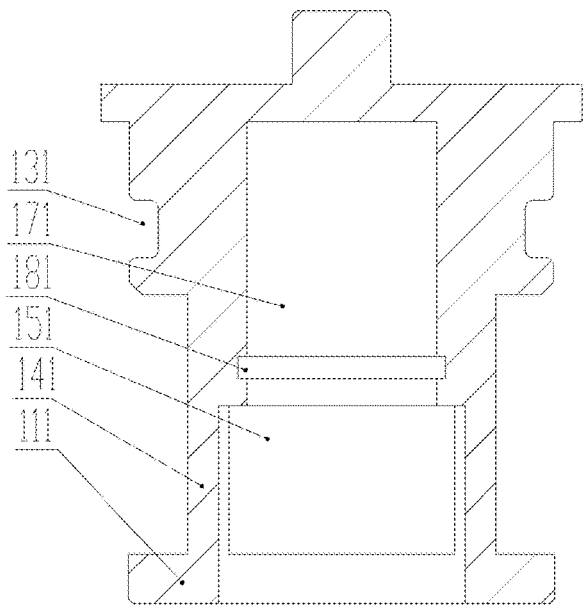
FIG. 11 is a sectional view of the cap shown in FIG. 10 taken along line D-D.
Figure 12:
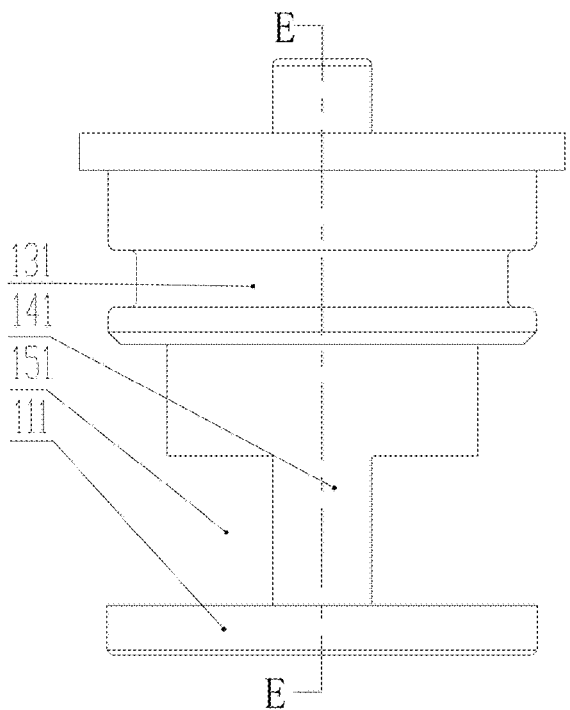
FIG. 12 is a left view of the cap shown in FIG. 9.
Figure 13:
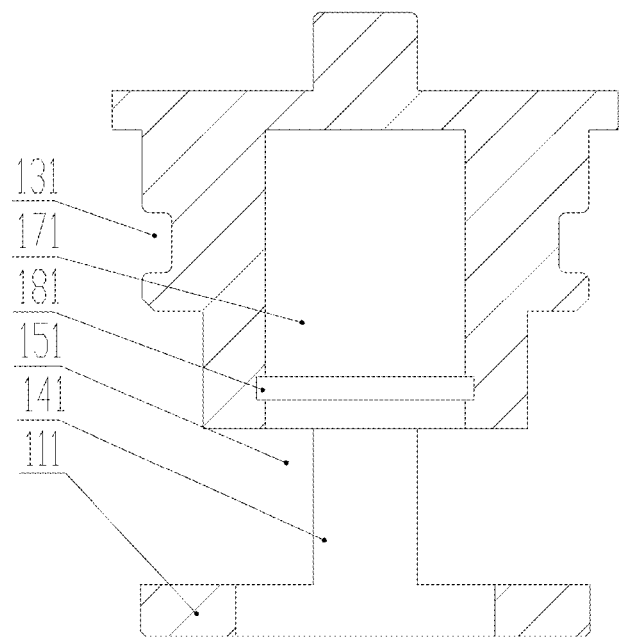
FIG. 13 is a sectional view of the cap shown in FIG. 12 taken along line E-E.
Figure 14:
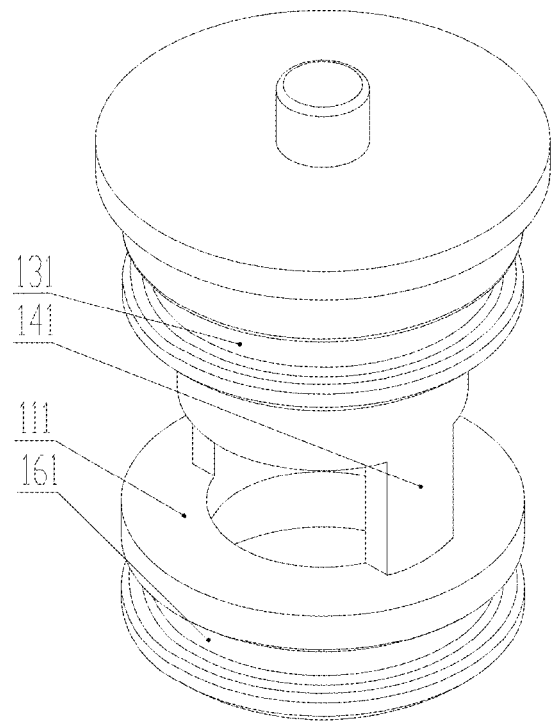
FIG. 14 is a perspective schematic view of an cap of the thermostatic valve according to the second embodiment of the present application.
Figure 15:
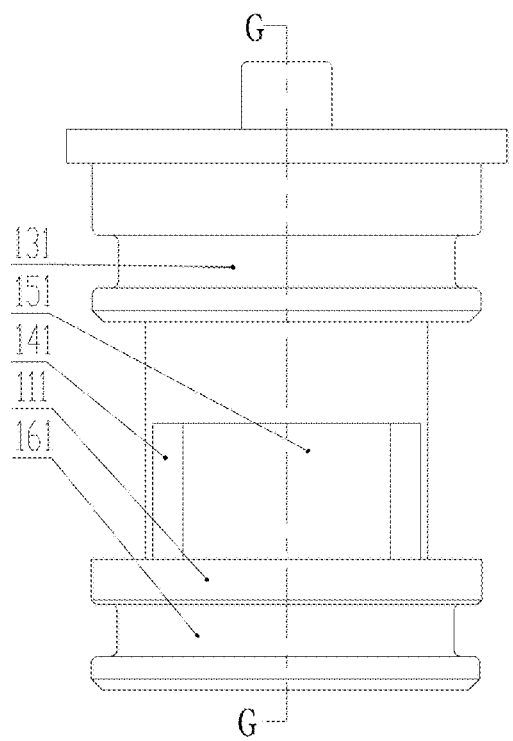
FIG. 15 is a front view of the cap shown in FIG. 14.
Figure 16:
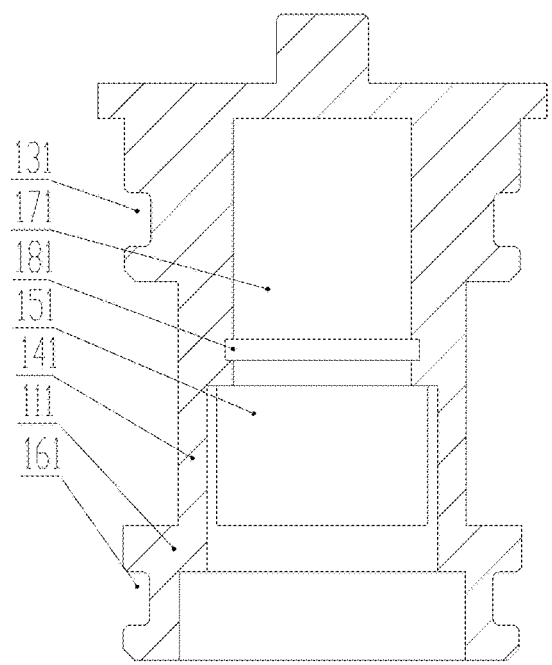
FIG. 16 is a sectional view of the cap shown in FIG. 15 taken along line G-G.
Figure 17:
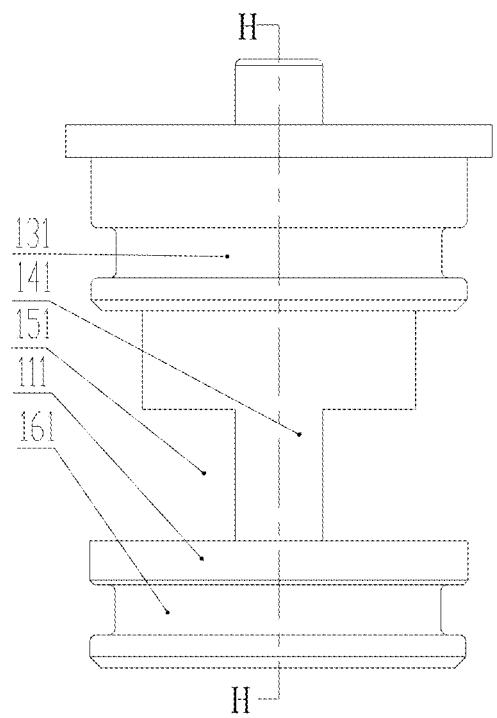
FIG. 17 is a left view of the cap shown in FIG. 14.
Figure 18:
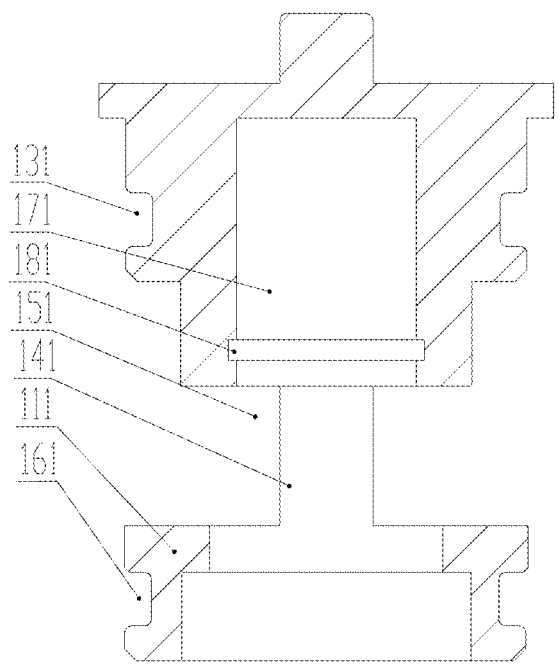
FIG. 18 is a sectional view of the cap shown in FIG. 17 taken along line H-H.

Unlike the first embodiment, in the thermostatic valve according to the second embodiment shown in FIGS. 7 and 8, a second sealing ring 191 is provided between the cap and the housing for sealing. Moreover, the second valve opening 115 is provided in the inner cavity of the sealing collar for better controlling the flow quantity of fluid passing through the passage.

Figure 19:
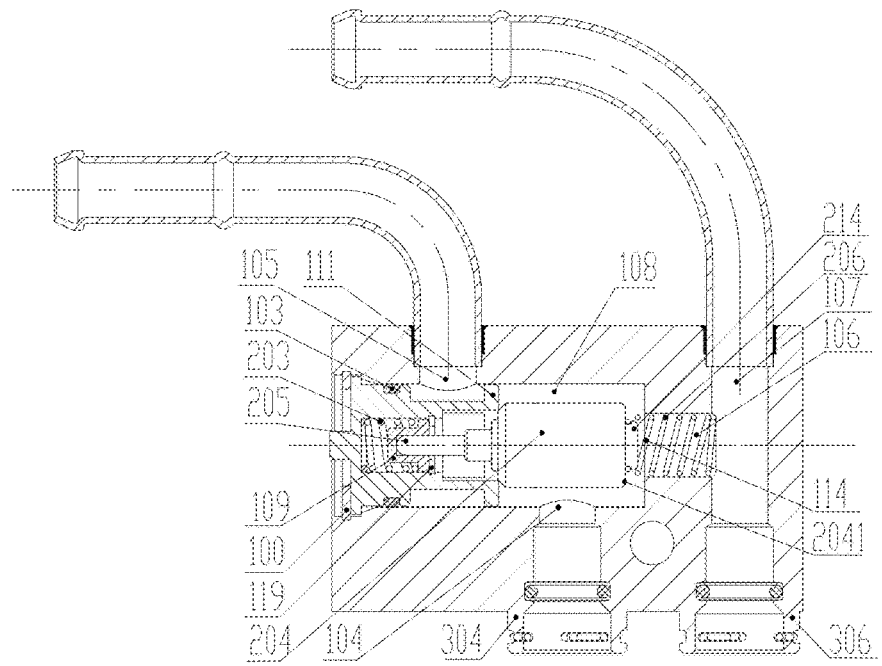
FIG. 19 is a sectional view of a thermostatic valve according to a third embodiment of the present application taken along line A-A in FIG. 2, which is in a state that the oil passage is blocked.
Figure 20:
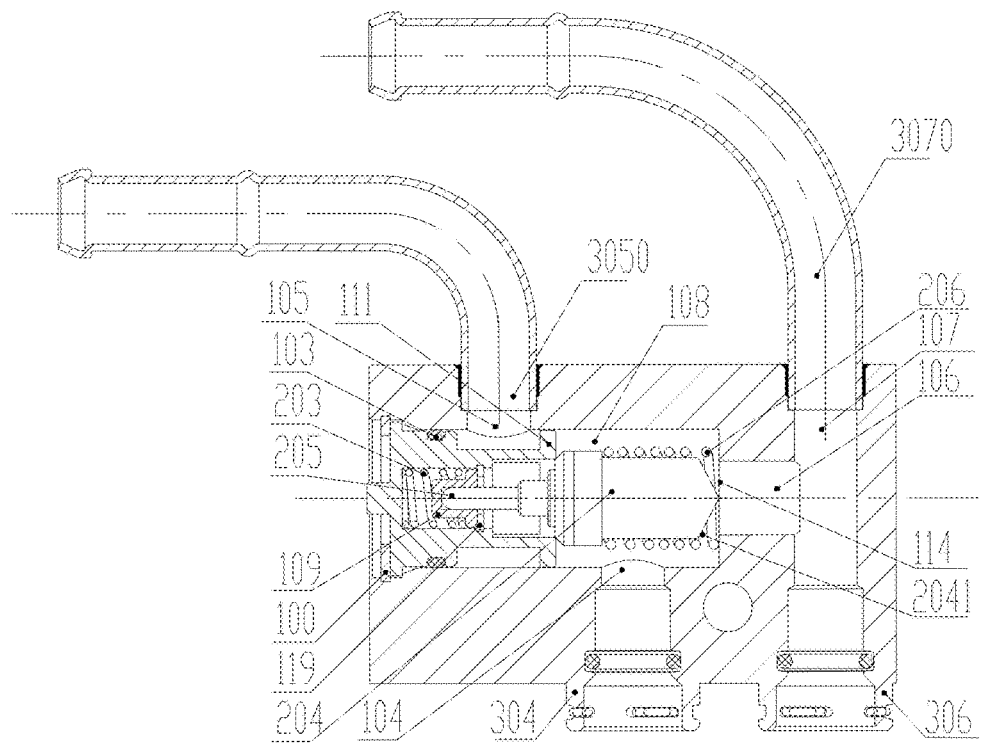
FIG. 20 is a sectional view of a thermostatic valve according to a fourth embodiment of the present application taken along line A-A in FIG. 2, which is in a state that the oil passage is blocked.

In addition, the retaining member 207 is not necessary, and the abutment with the first valve opening can be achieved in a way that a tail end of the main body 204 of the thermostatic actuating element, that has an outer diameter greater than the inner diameter of the third connecting port 106, directly abuts against a wall surface of the housing where the first valve opening 114 is provided, thus the third connecting port 106 is no longer in communication with the first connecting port, as shown in FIGS. 19 and 20. One end of the second elastic member 206 is connected to a second end of the main body 204 of the thermostatic actuating element, and the other end of the second elastic member 206 is in pressingly contact with the inner wall or the bottom wall of the housing 102, and a diameter of an outer side wall of the main body 204 of the thermostatic actuating element is greater than the inner diameter of the third connecting port 106.

In the embodiment shown in FIG. 19, the second end of the main body 204 of the thermostatic actuating element is provided with a mounting portion 214, the diameter of the outer side wall of the body portion of the main body 204 of the thermostatic actuating element is greater than the inner diameter of the third connecting port 106, and the outer diameter of each of the mounting portion 214 and the second elastic member 206 is smaller than the inner diameter of the third connecting port 106. One end of the second elastic member 206 is fixed by the mounting portion 214, and the other end thereof abuts against the inner wall of the housing 102, that is the shoulder position formed at the junction between the third connecting port 106 and the third passage 107. A stepped portion formed between the mounting portion and the main body forms the first engaging portion 2041 abutting against the portion where the first valve opening 114 is located. In this embodiment, the mounting portion 214 is integrally formed with the main body 204 of the thermostatic actuating element, and in practice, the mounting portion 214 and the main body 204 of the thermostatic actuating element can be separately formed.

In the embodiment shown in FIG. 20, the main body 204 of the thermostatic actuating element has a stepped cylindrical shape, and a first end of the main body 204 has a greater radius than the second end thereof, thereby forming a stepped shoulder portion. One end of the second elastic member 206 tightly presses the stepped shoulder portion of the circumferential side of the main body 204 of the thermostatic actuating element, and the other end of the second elastic member 206 is in pressingly contact with the inner wall of the receiving cavity of the housing 102, and in this embodiment, the other end of the second elastic member 206 is in pressingly contact with a flat surface where the first valve opening 114 is located. The second elastic member 206 having an inner diameter smaller than the outer diameter of the first end of the main body 204 of the thermostatic actuating element is sleeved on the second end of the main body 204 of the thermostatic actuating element, and a diameter of an outer side wall of the second end of the main body 204 of the thermostatic actuating element is greater than the inner diameter of the third connecting port 106. Additionally, in this embodiment, the second end of the thermostatic actuating element is configured with tapered shape, and in practical application, the second end can be a cylinder shape or have chamfer shape at the circumference thereof, in this way, during the stroke of the main body 204 of the thermostatic actuating element moving to abut against the portion where the first valve opening is located, the second passage still can maintain a certain transition flow, which may ensure the temperature to be more smooth. A third passage 107 in communication with the third connecting port 106 is further provided in the housing 102, and central axes of the third passage 107 and the third connecting port 106 are perpendicular to each other. In the embodiment illustrated in FIGS. 3 to 8 and 20, the flow direction of the fluid in the third passage 107 is downward. When the first passage is opened, the fluid in the third passage is coming from an external component. When the second passage is opened, the fluid flows from the first connecting port 104, through the first valve opening 114 and the third connecting port 106 and directly flows out of the thermostatic valve via the third passage 107. It should be noted that, the flow direction of the fluid in the third passage 107 is not limited to the downward direction, but also can be an upward direction, and the direction of the fluid in the third passage 107 can be determined as desired in practical application. For example, when oil enters into the thermostatic valve via the first connecting port, the flow direction of the fluid in the third passage is downward; and when oil flows out of the thermostatic valve via the first connecting port, the flow direction of the fluid in the third passage is upward, and the above solution is also practicable. No matter through which inlet of the thermostatic valve the fluid enters, the fluid entering from the inlet will be in communication with the main body of the thermostatic actuating element directly, thus the temperature sensed by the main body of the thermostatic actuating element is the temperature of the oil flowing out of the transmission.

Figure 21:
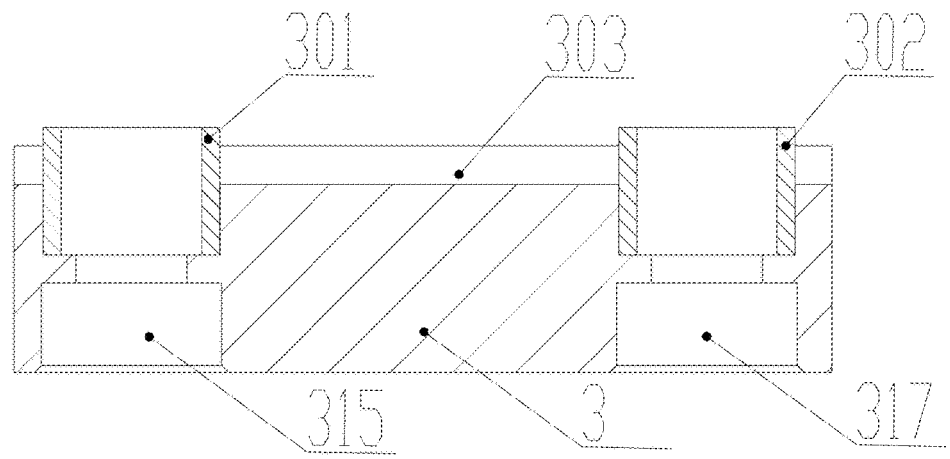
FIG. 21 is a sectional schematic view of a connector connecting the thermostatic valve of the present application with an external device.
Figure 22:
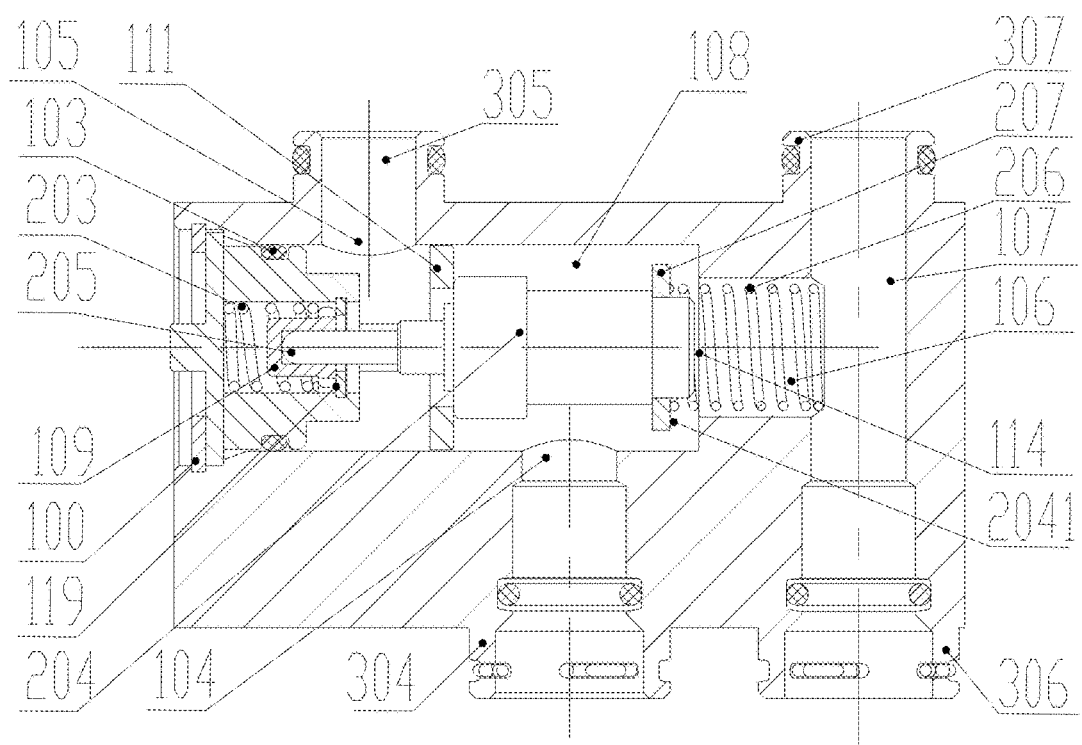
FIG. 22 is a sectional view of a thermostatic valve according to a fifth embodiment of the present application in a state that the oil passage is blocked.
Figure 23:
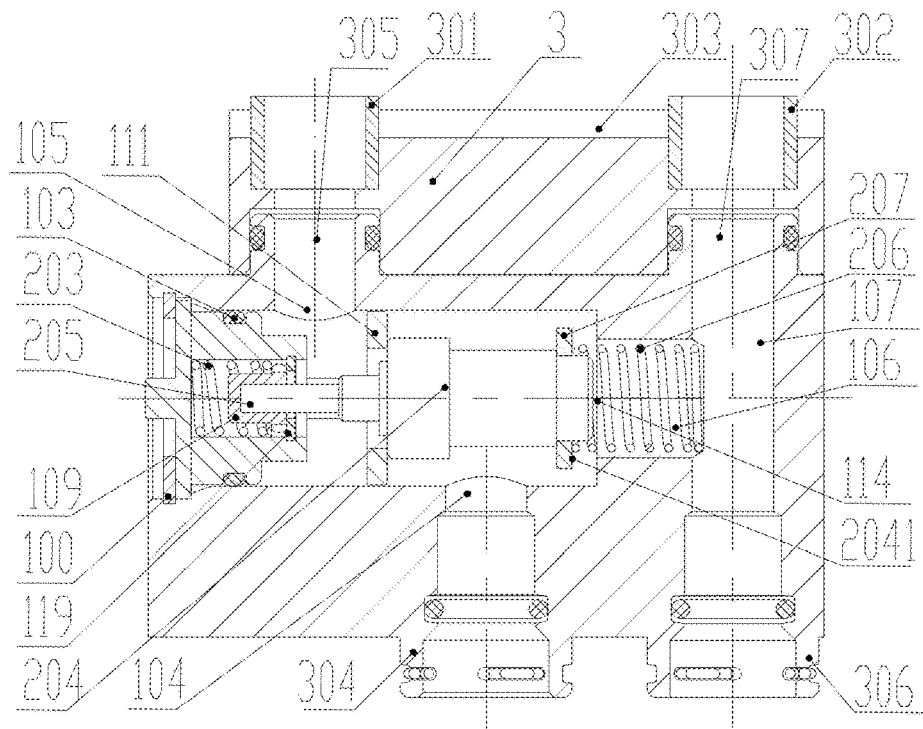
FIG. 23 is a sectional schematic view showing the thermostatic valve in FIG. 22 and the connector in FIG. 21 being assembled.

In the above embodiment, the thermostatic valve is connected to the fluid cooling device by pipe fittings, but the present application is not limited to this, as shown in FIG. 21, the thermostatic valve is connected to the external devices, such as the fluid cooling device, through a connector 3. As shown in FIGS. 21 to 23, external ports 305, 307 are provided on the outer side of the housing 102, and through holes 315, 317 having dimensions matching with the external ports 305, 307 are, respectively, provided on the connector 3 at positions corresponding to the external ports 305, 307. The connector 3 has a mounting surface 303 configured to connect the external device, and the mounting surface 303 has a shape matching with the contour shape of a mounting surface of the external device, and in this embodiment, the mounting surface 303 is an arc surface. In this embodiment, the connector 3 further includes communicating pipes mounted on a side of the connector 3 that is connected to the external device, and the communicating pipes include a first communicating pipe 301 and a second communicating pipe 302. The first communicating pipe 301 and the first through hole 315 are in communication with the first external port 305, and the second communicating pipe 302 and the second through hole 317 are in communication with the second external port 307.

There is a fixed connection relationship between the connector 3 and the thermostatic valve as well as between the connector 3 and the external device, which can be a detachable fixed connection, such as threaded connection, bayonet connection; and additionally, the connector 3 and the external device can also be fixed by welding.

In practical application, the thermostatic valve can be externally connected to the external cooling device and an oil tank of the transmission via pipes.

When the temperature of oil in the transmission is high, the thermosensitive substance 1 in the thermostatic actuating element is heated to expand. The main body of the thermostatic actuating element moves towards the third connecting port to increase the flow quantity of fluid in the first passage, until the retaining member or the tail end of the main body of the thermostatic actuating element abuts against the part where the first valve opening is located. In this case, the second passage is blocked, the first passage is open, and substantially all of the high-temperature oil from the transmission enters into the external cooling device through the thermostatic valve, and is cooled in the external cooling device, and then flows into the transmission through the third passage.

Figure 24:
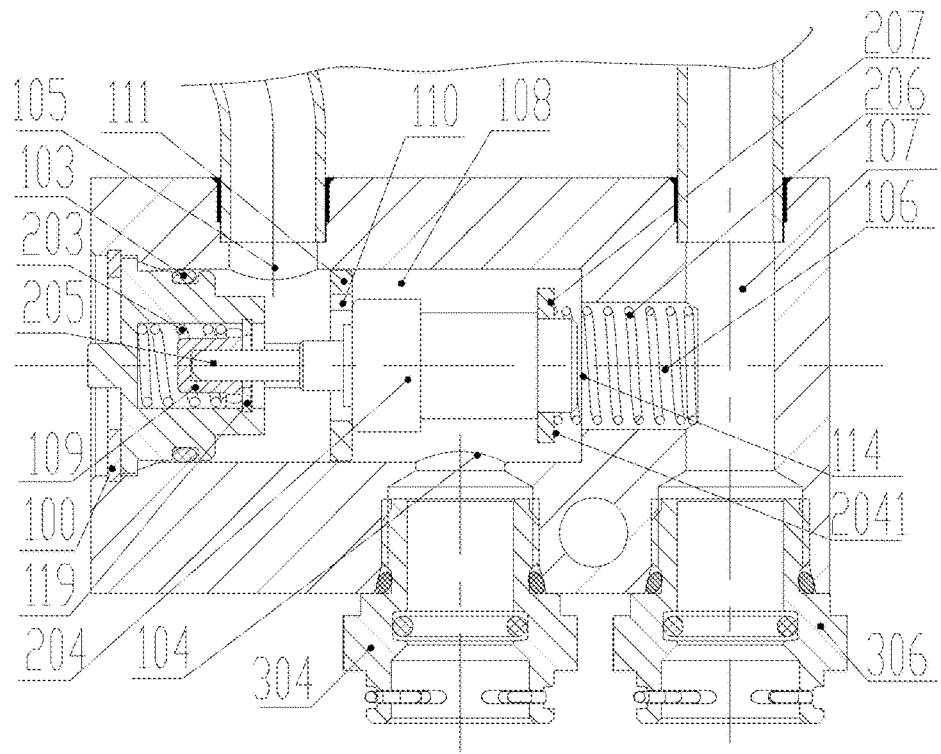
FIG. 24 is a sectional view of a thermostatic valve according to a sixth embodiment of the present application in a state that the oil passage is blocked.
Figure 25:
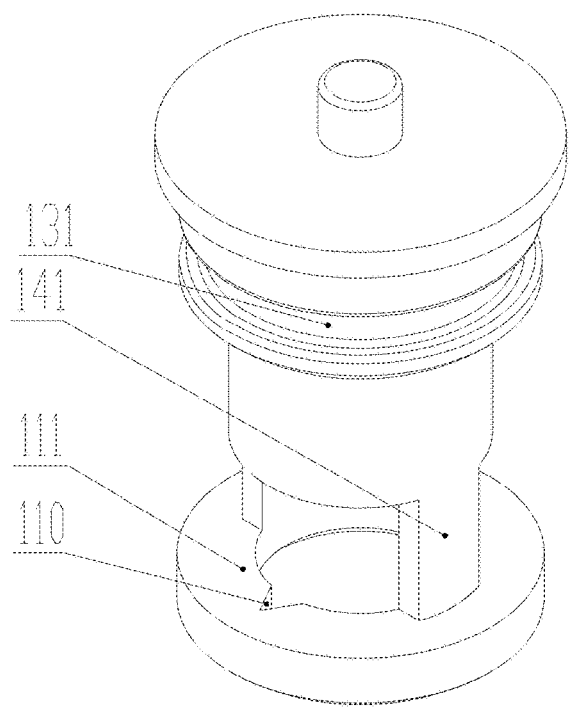
FIG. 25 is a perspective schematic view of the cap of the thermostatic valve shown in FIG. 24.
Figure 26:
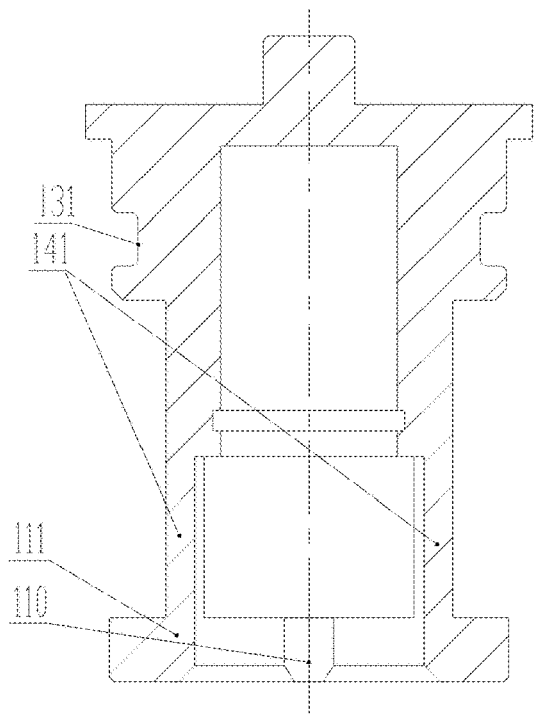
FIG. 26 is a sectional view of the cap.

When the temperature of the oil in the transmission is low, the thermosensitive substance in the thermostatic actuating element contracts. The main body of the thermostatic actuating element is moved towards the sealing collar under the action of an elastic force of the second elastic element, until the second engaging portion 2042 of the main body of the thermostatic actuating element abuts against the sealing collar 111 to close the inner hole of the sealing collar, i.e. the second valve opening 115, when the temperature of the oil is reduced to a certain degree. In this case, the first passage is blocked, the second passage is open, and the low-temperature oil from the transmission directly flows back into the transmission through the thermostatic valve. The low-temperature oil exchanges heat with components of the transmission which generate heat gradually, thus the temperature of the oil is gradually increased. In this way, a part of the oil flows to the external cooling device through the first passage, thereby achieving the purpose of automatic oil temperature control. Besides, in order to ensure the flowability of the oil in the external cooling device to more accurately control the oil temperature, especially when the oil temperature is low, the first passage is closed at the beginning to allow the oil to directly flow back into the transmission through the thermostatic valve, which shortens the temperature-rising time of the oil and thus maintains a good lubricating state in the transmission. However, at this time, the temperature of the oil in the external cooling device is relatively low, thus if the oil is circulated at the beginning, the cool oil may directly flow back to the transmission, which may affect the transmission to a certain extent. Hence, based on the above embodiments, a further improvement is made according to the present application to maintain a certain flow when the first passage is closed, as shown in FIGS. 24 to 26. Unlike the above embodiments, in this embodiment, a bypass passage 110 is provided on the sealing collar 111, and the bypass passage 110 can be a small hole provided on the sealing collar, such as a small hole with a size of 0.3 to 1.5 mm. The small hole is not necessarily a round hole, but can also be a through hole in other shapes, as long as the flow rate thereof is equivalent to that of the round hole having a diameter of 0.3 to 1.5 mm. It is preferable that, the size of the small hole ranges from 0.7 to 0.9 mm. The small hole can also be a notch shown in the figures. In such case, when the first passage is closed, the fluid can flow through the bypass passage 110, thereby ensuring a small flow quantity; and when the first passage is opened, the oil of the external cooling device may flows back to the transmission with a suitable temperature, thus the variation in the temperature of the oil can be reduced, and the transmission can work better.

The thermostatic valve according to the present application is described in detail hereinbefore. The principle and the embodiments of the present application are illustrated herein by specific examples. The above description of examples is only intended to help the understanding of the method and the spirit of the present application. It should be noted that, for the person skilled in the art, a few of modifications and improvements may be made to the present application without departing from the principle of the present application, and these modifications and improvements are also deemed to fall into the scope of the present application defined by the claims.

The invention claimed is:

1. A thermostatic valve, comprising a housing in which a receiving cavity is provided, and a thermostatic actuating element mounted in the receiving cavity, wherein the receiving cavity is in communication with an outside of the housing through at least three connecting ports comprising a first connecting port, a second connecting port and a third connecting port; the thermostatic actuating element comprises a main body of the thermostatic actuating element in which a thermosensitive substance is provided, and the thermostatic actuating element is mounted in the receiving cavity of the housing via two elastic members; and an annular sealing collar which is fixedly mounted is provided in the receiving cavity, and the first connecting port and the second connecting port are located at two sides of the annular sealing collar, respectively;

a first passage is opened in a case that the second connecting port, an inner hole of the annular sealing collar and the first connecting port are in communication with each other, and a second passage is opened in a case that the first connecting port and the third connecting port are in communication with each other;

in a case that a fluid has a first temperature, the thermosensitive substance in the thermostatic actuating element contracts, the main body of the thermostatic actuating element is moved towards the annular sealing collar under an action of an elastic force of the two elastic members, which enables a second engaging portion of the main body of the thermostatic actuating element, to abut against the annular sealing collar or cover the inner hole of the annular sealing collar, to block the first passage and open the second passage, wherein the second engaging portion maybe fixedly provided on the main body of the thermostatic element; and in a case that the fluid has a second temperature, the thermosensitive substance in the thermostatic actuating element expands, the main body of the thermostatic actuating elements moves towards the third connecting port, until a first engaging portion of the main body of the thermostatic actuating element abuts against an end surface of a part of the housing where the third connecting port is located or covers the third connecting port, to block the second passage and open the first passage, wherein the first engaging portion maybe fixedly provided on the main body of the thermostatic element;

wherein a first valve opening is provided in the housing at a position where the third connecting port is provided; and the housing has an open end which is in communication with the receiving cavity, the open end of the housing is sealed by a cap which is fixedly and hermetically mounted; the thermostatic actuating element further comprises a piston which is slidably mounted at a first end of the main body of the thermostatic actuating element, and one end of the piston is located outside the main body of the thermostatic actuating element and passes through an annular hole of the annular sealing collar; and the two elastic members comprise a first elastic member and a second elastic member; the first elastic member is arranged at the cap or at a side adjacent to the cap, and the first elastic member has one end abutting against the cap, and another end abutting against or indirectly abutting against the piston at least during movement of the thermostatic actuating element; the second elastic member is arranged at the third connecting port or a side adjacent to the third connecting port, and the second elastic member has one end abutting against an inner wall or a bottom wall of the receiving cavity of the housing, and another end abutting against the main body; an initial deformation force of the first elastic member is greater than or equal to a pressure applied to the second elastic member when the first engaging portion abuts against a part where the first valve opening is located.

2. The thermostatic valve according to claim 1, wherein the first valve opening is a port communicating the third connecting port with a second cavity where the main body of the thermostatic actuating element is provided; in a case that the first valve opening is closed, the second passage is blocked and the first passage is opened; a second valve opening is provided on the annular sealing collar to communicate the first connecting port with the second connecting port, and the second valve opening is a port of the annular sealing collar that faces the third connecting port or a port of the inner hole of the annular sealing collar; and in a case that the second valve opening is closed, the second passage is opened and the first passage is blocked.

3. The thermostatic valve according to claim 2, wherein the thermosensitive substance expands when the thermostatic actuating element is heated, and after the piston abuts against or indirectly abuts against the first elastic member, the main body is moved with respect to the piston, such that moves towards the third connecting port, until the first engaging portion abuts against the part where the first valve opening is located, and then the piston compresses the first elastic member and moves towards the cap.

4. The thermostatic valve according to claim 1, wherein a third passage in communication with the third connecting port is provided in the housing, a shoulder portion is formed at a junction of the third connecting port and the third passage, and the second elastic member abuts against the shoulder portion formed at the junction between the third connecting port and the third passage; in a case that the fluid has the second temperature, the thermosensitive substance in the thermostatic actuating element expands, the main body of the thermostatic actuating element moves towards the third connecting port against the elastic force of the second elastic member, until the first engaging portion is in pressingly contact with the part where the first valve opening is located to block the third connecting port; and a distance from a bottom of the third passage to a bottom of the third connecting port is L, and a diameter of the passage is R, wherein $1 > L/R \geq 1/16$.

5. The thermostatic valve according to claim 3, wherein a retaining member is provided at a circumferential side of the main body of the thermostatic actuating element, an outer diameter of the retaining member is greater than an inner diameter of the third connecting port; one end, which is between the retaining member and the third connecting port, of the main body has an outer diameter smaller than the inner diameter of the third connecting port, the second elastic member has one end in pressingly contact with the retaining member, and the other end in pressingly contact with the inner wall or the bottom wall of the receiving cavity of the housing, and the retaining member is fixedly mounted or integrally formed with the main body of the thermostatic actuating element; in a case that the thermostatic actuating element is heated, the main body moves downwards to drive the retaining member to move, until the first engaging portion, facing the third connecting port, of the retaining member abuts against the part where the first valve opening is located, to block the third connecting port; and then a force generated by the expansion of the thermosensitive substance of the thermostatic actuating element when being heated is enough to continue compressing the first elastic member.

6. The thermostatic valve according to claim 3, wherein a mounting portion is provided at the second end of the main body of the thermostatic actuating element, a diameter of an outer side wall of the main body of the thermostatic actuating element is greater than an inner diameter of the third connecting port, and one end of the second elastic member is fixed by the mounting portion; a third passage is provided in the housing to communicate the third connecting port with a corresponding external port; a flat surface portion is provided between the outer side wall of the main body and the mounting portion and functions as the first engaging portion for cooperating with the first valve opening, the mounting portion is configured to radially limit the second elastic member, a flat contacting part of the first engaging portion on the main body is configured to axially limit the second elastic member; an outer diameter of each of the second elastic member and the mounting portion is smaller than the inner diameter of the third connecting port, the other end of the second elastic member extends into the third connecting port of the housing and is in pressingly contact with the inner wall or the bottom wall of the housing; and when the first engaging portion of the main body abuts against the part where the valve opening is located, the main body blocks the third connecting port to separate the external port in communication with the third connecting port from the first connecting port.

7. The thermostatic valve according to claim 3, wherein a passage is provided in the housing to communicate the third connecting port with a corresponding external port; the main body of the thermostatic actuating element is of a stepped cylindrical shape, and a first end of the main body has an outer diameter greater than an outer diameter of a second end of the main body, to form a stepped shoulder; the one end of the second elastic member is pressingly connected to the stepped shoulder portion on the circumferential side of the main body of the thermostatic actuating element, the other end of the second elastic member is in pressingly contact with an inner wall of the housing at a position where the valve opening is located; a second elastic member having an inner diameter smaller than the outer diameter of the first end of the main body of the thermostatic actuating element is sleeved on the second end of the main body of the thermostatic actuating element, and a diameter of the outer side wall of the second end of the main body of the thermostatic actuating element is greater than the inner diameter of the third connecting port; a circumferential side of an end portion of the second end of the main body is chamfered or the end portion of the second end of the main body is frustum-shaped; the end portion, facing the third connecting port, of the second end of the main body functions as the first engaging portion for cooperating with the first valve opening; in a case that the thermostatic actuating element is heated, when the engaging portion of the main body abuts against the part where the valve opening is located, the main body blocks the third connecting port to separate the external port in communication with the third connecting port through the passage from the first connecting port.

8. The thermostatic valve according to claim 3, wherein the cap is provided with an open end functioning as a receiving portion, and the open end faces the receiving cavity of the housing; and the thermostatic valve further comprises a spring seat, and a retaining member which is axially positioned, wherein the retaining member is fixed to the cap or integrally formed with the cap; and a first elastic member of the two elastic members is arranged in the receiving portion of the cap, which has one end abutting against a bottom wall of the receiving portion of the cap, and another end abutting against the spring seat; and the first elastic member, the spring seat and the retaining member are arranged in the receiving portion of the cap in sequence, and the spring seat is fixed in the receiving portion of the cap via the retaining member.

9. The thermostatic valve according to claim 8, wherein a surface of the spring seat away from the receiving portion is in pressingly contact with the retaining member or the piston; and when the piston is moving, the piston is in contact with the first elastic member via the spring seat.

10. The thermostatic valve according to claim 9, wherein the cap is provided with a groove at the receiving portion, the retaining member is retained in the recess to be axially positioned; the cap is fixed to the housing by a snap ring, the snap ring is provided at the open end of the housing, the cap is fixed at the open end of the housing by the snap ring, and a sealing member is provided between an outer side wall of the cap and the inner wall of the housing.

11. The thermostatic valve according to claim 1, wherein the cap is integrally formed with the annular sealing collar, the cap is fixedly connected to the annular sealing collar via a connecting portion, a fluid communicating hole is provided between the cap and the annular sealing collar, and the second connecting port, the fluid communicating hole, the inner hole of the annular sealing collar and the first connecting port are in communication with each other to form the first passage; and an outer diameter portion of the annular sealing collar is 0.05 to 0.30 mm smaller than an inner wall of a portion, corresponding to the annular sealing collar, on the receiving cavity of the housing.

12. The thermostatic valve according to claim 11, wherein the outer wall of the housing is provided with a connecting member for communicating the receiving cavity with an external device, and the connecting member is integrally formed with the housing; and the piston is integrally formed with the spring seat, or one end of the piston of the thermostatic actuating element is fixedly mounted on the spring seat.

13. The thermostatic valve according to claim 12, wherein the thermostatic valve is connected to the external device via a connector, an external port is provided on an outer side of the housing, and a through hole having a dimension matching with a dimension of the external port is provided on the connector at a position corresponding to the external port; and a contour shape of a mounting surface of the connector configured to connect the external device matches with a contour shape of a mounting surface of the external device.

14. The thermostatic valve according to claim 3, wherein a bypass passage is provided on the annular sealing collar, and in a case that the first passage is blocked, the bypass passage allows the fluid to flow at a first flow quantity.

15. The thermostatic valve according to claim 14, wherein the bypass passage is a notch adjacent to the inner hole of the annular sealing collar or a through hole provided on the sealing collar, and a size of the hole ranges from 0.3 to 1.5 mm.

16. The thermostatic valve according to claim 4, wherein the cap is provided with an open end functioning as a receiving portion, and the open end faces the receiving cavity of the housing; and the thermostatic valve further comprises a spring seat, and a retaining member which is axially positioned, wherein the retaining member is fixed to the cap or integrally formed with the cap; and a first elastic member of the two elastic members is arranged in the receiving portion of the cap, which has one end abutting against a bottom wall of the receiving portion of the cap, and another end abutting against the spring seat; and the first elastic member, the spring seat and the retaining member are arranged in the receiving portion of the cap in sequence, and the spring seat is fixed in the receiving portion of the cap via the retaining member.

17. The thermostatic valve according to claim 5, wherein the cap is provided with an open end functioning as a receiving portion, and the open end faces the receiving cavity of the housing; and the thermostatic valve further comprises a spring seat, and a retaining member which is axially positioned, wherein the retaining member is fixed to the cap or integrally formed with the cap; and a first elastic member of the two elastic members is arranged in the receiving portion of the cap, which has one end abutting against a bottom wall of the receiving portion of the cap, and another end abutting against the spring seat; and the first elastic member, the spring seat and the retaining member are arranged in the receiving portion of the cap in sequence, and the spring seat is fixed in the receiving portion of the cap via the retaining member.

18. The thermostatic valve according to claim 1, wherein a bypass passage is provided on the annular sealing collar, and in a case that the first passage is blocked, the bypass passage allows the fluid to flow at a first flow quantity.

19. The thermostatic valve according to claim 18, wherein the cap is integrally formed with the annular sealing collar, the cap is fixedly connected to the annular sealing collar via a connecting portion, a fluid communicating hole is provided between the cap and the annular sealing collar, and the second connecting port, the fluid communicating hole, the inner hole of the annular sealing collar and the first connecting port are in communication with each other to form the first passage; and an outer diameter portion of the annular sealing collar is 0.05 to 0.30 mm smaller than an inner wall of a portion, corresponding to the annular sealing collar, on the receiving cavity of the housing.

20. The thermostatic valve according to claim 2, wherein a bypass passage is provided on the annular sealing collar, and in a case that the first passage is blocked, the bypass passage allows the fluid to flow at a first flow quantity.

* * * * *